(12) United States Patent
Mikami et al.

(10) Patent No.: US 6,574,431 B2
(45) Date of Patent: *Jun. 3, 2003

(54) LENS-CARRYING PHOTO FILM UNIT HAVING PROTECTIVE COVER

(75) Inventors: Yuji Mikami, Kanagawa (JP); Osamu Noguchi, Kanagawa (JP); Nobuyuki Kameyama, Kanagawa (JP); Toshihide Nagasaka, Kanagawa (JP); Akira Fukano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,247

(22) Filed: May 6, 2002

(65) Prior Publication Data

US 2002/0154906 A1 Oct. 24, 2002

Related U.S. Application Data

(62) Division of application No. 09/509,952, filed as application No. PCT/JP98/04425 on Oct. 1, 1998, now Pat. No. 6,424,803.

(30) Foreign Application Priority Data

| Oct. 6, 1997 | (JP) | 9-272660 |
| Oct. 6, 1997 | (JP) | 9-272661 |
| Dec. 17, 1997 | (JP) | 9-347784 |
| Dec. 26, 1997 | (JP) | 9-359055 |

(51) Int. Cl.$^7$ .............................................. G03B 17/02
(52) U.S. Cl. ....................................... 396/6; 396/448
(58) Field of Search ................................. 396/6, 448

(56) References Cited

U.S. PATENT DOCUMENTS

| 3,810,227 A | * 5/1974 | Tanaka | 396/448 |
| 4,451,130 A | * 5/1984 | Yan | 396/336 |
| 4,557,574 A | 12/1985 | Kohno et al. | |
| 5,608,478 A | * 3/1997 | Kamoda | 396/266 |
| 6,151,455 A | 11/2000 | Mikami et al. | |

FOREIGN PATENT DOCUMENTS

| JP | 59-123846 | 8/1984 |
| JP | 60-60733 | 4/1985 |
| JP | 60-60737 | 4/1985 |
| JP | 61-103130 | 5/1986 |
| JP | 62-22641 | 2/1987 |
| JP | 2-39245 | 3/1990 |
| JP | 9-211708 | 8/1997 |

* cited by examiner

Primary Examiner—David M. Gray
(74) Attorney, Agent, or Firm—Young & Thompson

(57) ABSTRACT

A protective cover (13) for a taking lens is provided in the front of a lens-fitted photo film unit. The protective cover cooperates with a shutter locking mechanism which locks a shutter button (4) when the protective cover is in a closed position in front of the taking lens. The protective cover also cooperates with a flash prevention mechanism which turns off a flash charge switch off when the protective cover moves in the closed position, prevents the flash charge switch from being moved to its ON position so long as the protective cover is in the closed position, and allows the flash charge switch to be moved to the ON position when the protective cover is moved away from the taking lens. The protective cover is slidable in a horizontal direction on a front surface portion of the film unit, and the front surface portion is straight in the horizontal direction. The protective cover has a vertical length that does not interfere with a bottom lid (12) that is provided for removal of an exposed photo filmstrip. A first label is stuck on a front surface of the protective cover, and a second label is wrapped around the film unit excluding the front surface portion the protective cover slide thereon, to decorate and dust-proof the film unit and reinforce the unit housing.

7 Claims, 13 Drawing Sheets

LENS-CARRYING PHOTO FILM UNIT HAVING PROTECTIVE COVER

This application is a division of application Ser. No. 09/509,952, filed on Apr. 4, 2000. Application Ser. No. 09/509,952 now U.S. Pat. No. 6,424,803 is the national phase of PCT International Application No. PCT/JP98/04425 filed on Oct. 1, 1998 under 35 U.S.C. §371. The entire contents of each of the above-identified applications are hereby incorporated by reference.

FIELD OF THE ART

The present invention relates to a lens-fitted photo film unit with a protective cover which is movable between a closed position for covering a taking lens and an open position for uncovering the taking lens.

BACKGROUND ARTS

A lens-fitted photo film unit is widely known as a device, which is provided with a simple exposure mechanism and is loaded with an unexposed photo film cartridge in the factory, so that anyone can enjoy photography without bothering about loading and rewinding the film. Hereinafter, the lens-fitted photo film unit will be referred to as a film unit.

To improve the portability, the film unit has been made smaller and more compact. Also a film unit loaded with an IX240 type film cartridge that is smaller than a 135 type film cartridge has recently been produced and marketed. As containing the smaller IX240 type film cartridge, this film unit is designed to be smaller than that containing the 135 type film cartridge.

Indeed the small film unit is superior in portability, but the taking lens of the film unit tends to be stained as it is exposed all the time. Also, the photographer is more likely to touch the taking lens unconsciously. Accordingly, it is desirable to provide the film unit with a protective cover.

Japanese Utility Model Laid-open Application No. 60-60736 discloses a camera with a protective cover that is slidable between a closed position covering the taking lens and an open position uncovering the taking lens. The protective cover has an opening. When the protective cover is moved in the open position, the opening is placed in front of a flash projector, exposing the flash projector. Also, when the protective cover is moved in the open position, a flash charge switch is automatically turned on.

Since the flash charge switch is automatically turned off by moving the protective cover in the closed position, the camera of the above mentioned publication has an advantage of saving the batteries. However, as the flash charge switch is turned on whenever the protective cover moves in the open position, this camera is inconvenient when the flash photography is not wanted.

Because the film unit is so handy, the risk of accidentally pressing the shutter button and releasing the shutter unexpectedly is relatively high. In most cameras, each operation of the shutter button is detected by an electric switch, so that it is possible to provide a shutter release prevention device at a low cost by adding a circuit or a sequence that invalidates a detection signal from the electric switch when a lens protective cover is closed position. Such a circuit or sequence does not need remodeling or restructuring the camera. On the contrary, since the film unit uses a mechanical shutter, it is difficult to adopt such an electric shutter release prevention device.

As a protective cover for a taking lens, a cover that extends from a top edge to a bottom edge of the front side of the camera and slidable in a horizontal direction of the camera is popular. However, because the film unit has a bottom lid that is to be opened to remove a film cartridge having an exposed photo filmstrip rewound thereinto, if the film unit is provided with a horizontally slidable protective cover that extends to the front bottom edge of the film unit, it would be impossible to open the bottom lid.

Meanwhile, it is usual for cameras to use a decorative cover for reinforcing joints between parts of a camera housing, and covering up unnecessary openings or the like, as well as for decoration of the camera housing. On the contrary, it is difficult for the film unit to provide such a decorative cover in terms of cost and portability. Nevertheless, the wall thickness of the plastic unit housing of the film unit has been decreased for the sake of making the film unit smaller and cutting the material cost down.

Because the parts of the unit housing of the film unit are fastened to each other through snap-in engagements between resilient hooks and holes, the joints between the parts of the unit housing are getting weaker with the wall of the unit housing getting thinner. This is because the stiffness of the unit housing is lowered with the reduced wall thickness, so the unit housing easily gets twisted or distorted when a large load is applied to the film unit, e.g. when the film unit drops down. As a result of distortion, the snap-in engagement is broken up.

For the reasons as above, the film unit has conventionally been encased in a cardboard box, or wrapped with a cardboard sheet. However, with the conventional cardboard box and sheet, it is impossible to mount a protective cover that is slidable in front of the taking lens of the film unit.

On the other hand, the thickness of the film unit around the taking lens depends upon the focal length of the taking lens, and upon the diameter of the film cartridge on the side of the cartridge chamber. Therefore, in order to reduce the thickness of the film unit, it is conventional to use the front of the cartridge chamber as a grip and set back the other front area of the film unit from the grip. To provide a slidable protective cover, it is most reasonable to make the protective cover movable in the horizontal direction between the front of the taking lens and the front of the cartridge chamber. However, in the conventional film unit having a convex or protruding grip in front of the cartridge chamber, it is difficult to make the protective cover slidable. Even through it is possible to provide a slidable protective cover, it would certainly increase the thickness of the film unit housing.

In view of the foregoing, an object of the present invention is to provide a film unit with a protective cover that turns off a flash device of the film unit when the protective cover is closed, but allows the photographer to chose between the flash photography and the non-flash photography in the open position of the protective cover.

Another object of the present invention is to provide a film unit with a protective cover, wherein the shutter is prevented from being released when the protective cover is closed, by use of an inexpensive and simple mechanism.

A further object of the present invention is to provide a film unit with a protective cover that is slidable on the front of the film unit without interfering with a bottom lid for the removal of the exposed film cartridge.

Still another object of the present invention is to provide a film unit with a protective cover, wherein joints between the parts of the unit housing through snap-in engagements are reinforced without hindering the movement of the protective cover.

A further object of the present invention is to provide a film unit with a protective cover that is easy to mount, slidable smoothly without increasing the thickness of the film unit housing.

DISCLOSURE OF THE INVENTION

According to the present invention, a lens-fitted photo film unit having a flash unit incorporated therein is provided with a protective cover movable between a closed position covering a taking lens and an open position uncovering the taking lens; a flash charge switch manually operable between an ON position for starting charging a main capacitor of the flash unit and an OFF position for terminating charging the main capacitor; and a flash prevention device which prevents the flash charge switch from being moved to the ON position when the protective cover is in the closed position, allows the flash charge switch to be moved to the ON position when the protective cover is in the open position, and causes the flash charge switch to move to the OFF position in cooperation with the protective cover moving to the closed position when the flash charge switch is in the ON position. Since the flash prevention device prevents the flash charge switch from being moved to the ON position when the protective cover is in the closed position, it makes sure to avoid wasting batteries due to unnecessary charging operation. When the protective cover is in the open position, the flash prevention device just permits operating the flash charge switch to the ON position, so it is possible to choose a non-flash photography. Because the flash prevention device forcibly moves the flash charge switch to the OFF position as the protective cover is moved to the closed position when the flash charge switch is in the ON position, a waste of batteries by forgetting to turn off the flash charge switch is highly prevented.

Another lens-fitted photo film unit of the present invention is provided with a shutter button resiliently displaced upon a pressing operation; a shutter mechanism activated when the displacement of the shutter button is transmitted thereto; a protective cover movable between a closed position covering a taking lens and an open position uncovering the taking lens; and a shutter locking device which prevents the displacement of the shutter button from being transmitted to the shutter mechanism when the protective cover is in the closed position.

According to a preferred embodiment of the invention, a lens-fitted photo film unit is further provided with a pushing rod which is displaced together with the shutter button and transmits the displacement of the shutter button to the shutter mechanism; an opening formed through a front wall of the film unit in opposition to the pushing rod; and a locking member constituting the shutter locking device, wherein in the closed position of the protective cover the locking member moves through the opening in a locking position where the locking member prevents the displacement of the pushing rod, whereas in the open position of the protective cover the locking member moves in an unlocking position where the locking member allows the displacement of the pushing rod. According to this embodiment, the shutter locking device may be provided at a low cost with a simple construction by utilizing a conventional shutter mechanism that is released through a pushing rod and an opening that is needed for plastic forming the pushing rod.

The present invention also provides a lens-fitted photo film unit which has a cartridge chamber and a film roll chamber on opposite horizontal sides of a taking lens and a bottom lid at bottom of the cartridge chamber, wherein the bottom lid extends a little to a front portion of the film unit beyond a front bottom corner of the film unit; and a protective cover for opening and closing the taking lens has a vertical length that does not reach the front bottom corner of the film unit. So the protective cover is movable between a position in front of the taking lens and a position in front of the cartridge chamber without interfering with the bottom lid.

In a lens-fitted photo film unit having a unit housing which is constituted of at least two parts, including a front cover with a lens opening for exposing a taking lens and a rear cover, the present invention provides a protective cover movable in front of the front cover between a closed position covering the lens opening and an open position uncovering the lens opening; a first label stuck on a front surface of the protective cover; and a second label stuck on the unit housing across joints between the parts of the unit housing. To make the protective cover movable, two separate labels are used. Since one of the two labels covers the joints between the parts of the unit housing, the unit housing is reinforced.

In a lens-fitted photo film unit having a cartridge chamber and a film roll chamber on opposite horizontal sides of a taking lens, the present invention provides a protective cover slidable on a front surface of the film unit in a range between a position in front of the taking lens and a position in front of the cartridge chamber, wherein the front surface has a surface contour that is straight in the horizontal direction at least in the sliding range of the protective cover. According to this configuration, the surface the protective cover slides thereon is straight in the sliding direction, so the protective cover is easy to mount and operated smoothly. Moreover, an increase in thickness of the film unit involved by the provision of the protective cover may be reduced to the minimum.

BRIEF DESCRIPTION OF THE DRAWINGS

FIG. 1 shows a perspective view of a film unit according to a preferred embodiment of the invention, with its protective cover open and its flash charge switch ON;

FIG. 12 shows an exploded fragmentary view of a front cover of the film unit of FIG. 8, before the labels are stuck on;

PREFERRED EMBODIMENTS OF THE INVENTION

The present invention will be described in more detail with reference to the accompanying drawings.

Figure 1:
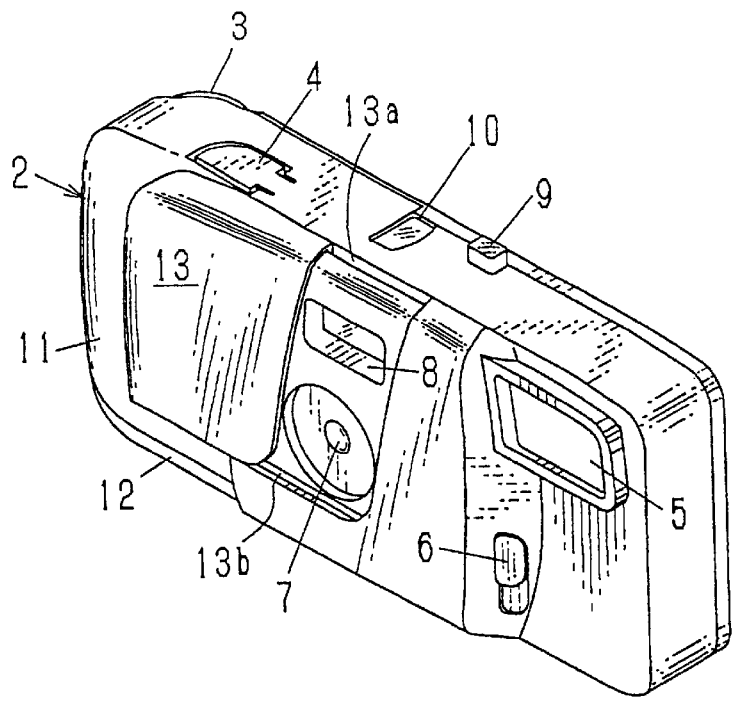

In FIG. 1, a film unit 2 is provided with a film winding wheel 3, a shutter button 4, a flash protector 5, a flash charge switch 6, a taking lens 7, a finder objective window 8, a charge condition indicator 9, and a frame counter window 10, which are exposed to the outside. A bottom lid 12 for removal of an exposed filmstrip is provided on a left bottom side of the film unit 2 in the drawings, and extends to a lower portion of a left front area 11 of the film unit 2 beyond a front bottom corner of the film unit 2.

Figure 2:
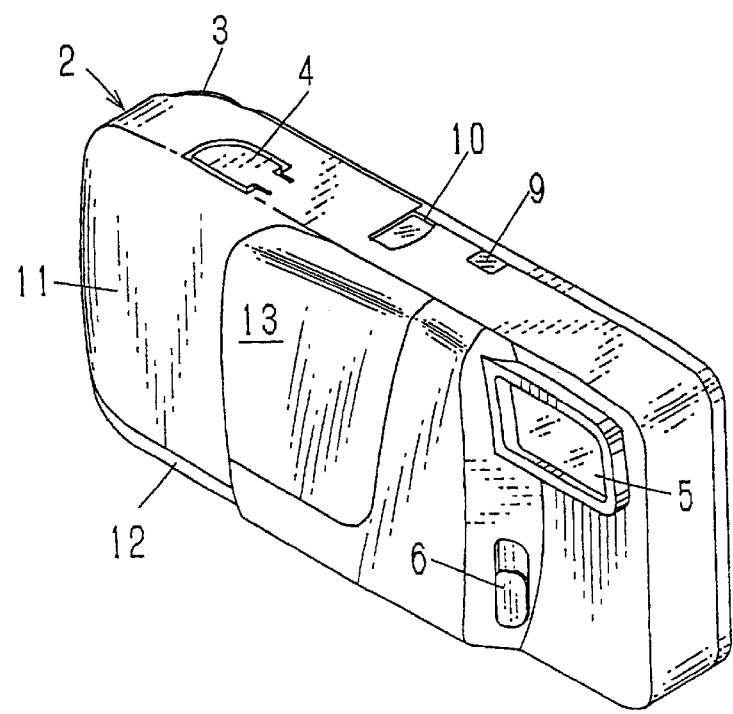
FIG. 2 shows a perspective view of the film unit of FIG. 1, with its protective cover closed and its flash charge switch OFF.

A protective cover 13 for protecting the taking lens 7 is provided on a front side of the film unit 2, so as to be slidable in a horizontal direction or a longitudinal direction of the film unit 2. The protective cover 13 is formed as an integral part from a plastic material, and has hooks on upper and lower ends thereof. The hooks are engaged in sliding grooves 13*a* and 13*b* extending in the horizontal direction above the finder objective window 8 and below the taking lens 7 respectively. Thus, the protective cover 13 slides horizontally between a closed position as shown in FIG. 2, covering the taking lens 7 and the finder objective window 8 and an open position as shown in FIG. 1, uncovering these elements 7 and 8. As the protective cover 13 does not extend to the bottom of the film unit 2, the protective cover 13 does not interfere with the bottom lid 12.

The charge condition indicator 9 is comprised of a light guide, which comes up when the flash charge switch 6 is turned on, as shown in FIG. 1, and retracts into the film unit 2 when the flash charge switch 6 is turned off, as shown in FIG. 2.

Figure 3:
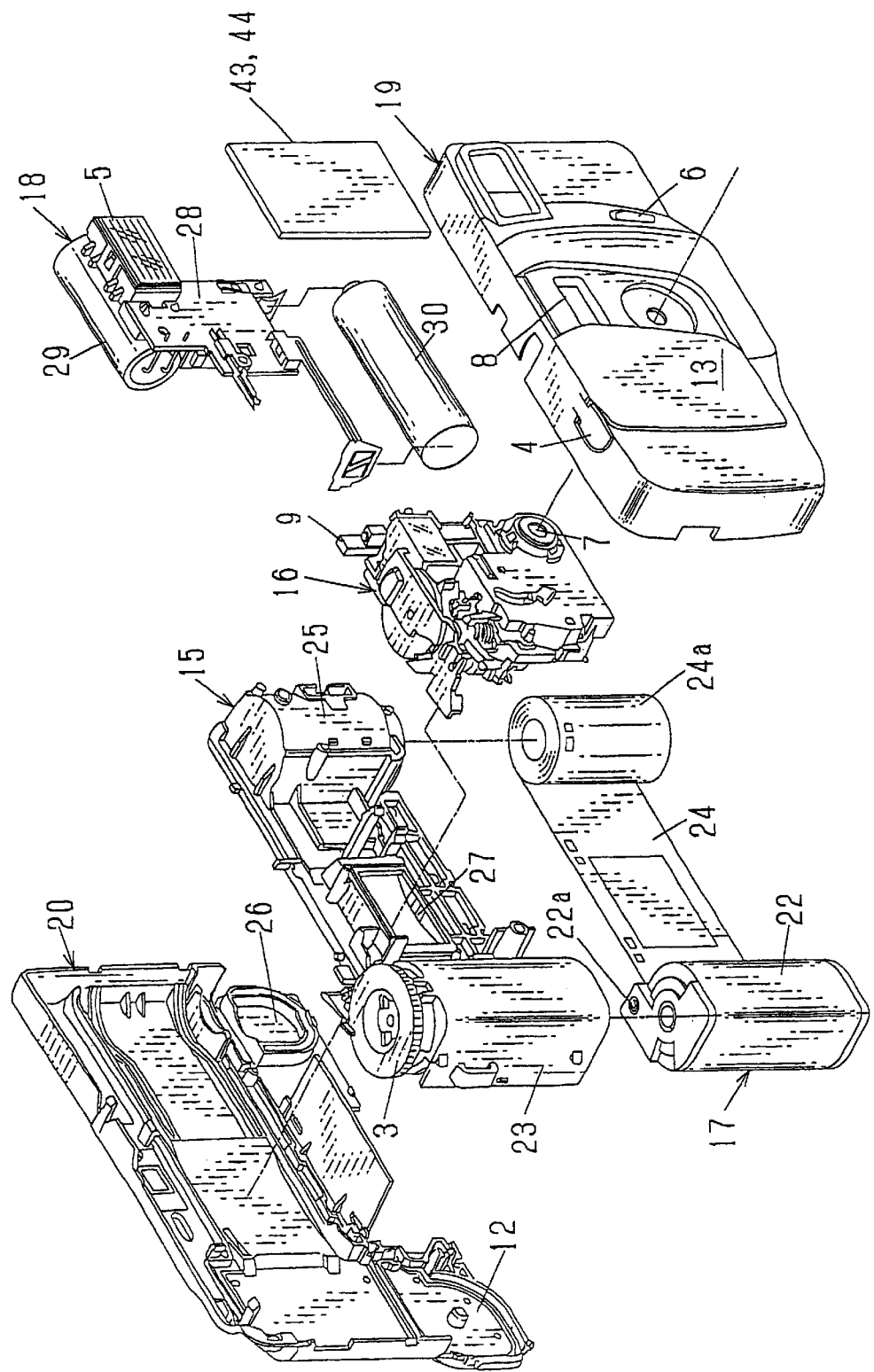
FIG. 3 shows an exploded view of the film unit of FIG. 1.

As shown in FIG. 3, the film unit 2 is constituted of a basic portion 15, an exposure unit 16, a photo film cartridge 17, a flash unit 18, a front cover 19 and a rear cover 20. The front and rear covers 19 and 20 constitute a film unit housing, covering the basic body 15, the exposure unit 16, the photo film cartridge 17, and the flash unit 18.

The basic portion 15 has a cartridge chamber 23 and a film roll chamber 25 formed integrally therewith, for holding a cartridge shell 22 and an unexposed filmstrip 24 coiled into a roll 24*a* respectively therein. These chambers 23 and 25 have open rear sides which are closed by the rear cover 20 in a light-tight fashion, after the photo film cartridge 17 is loaded.

Bottom sides of the cartridge chamber 23 and the film roll chamber 25 are also open, and are closed by the bottom lid 12 and a second bottom lid 26 respectively, after the photo film cartridge 17 is loaded. The bottom lids 12 and 26 are formed integrally with the rear cover 20.

The photo film cartridge 17 is a well-known IX240 type cartridge that has a door member 22*a* at a film port of the cartridge shell 22. When the door member 22*a* is open, the filmstrip 23 is advanced out of the cartridge shell 22 through the film port by rotating a spool 21 of the cartridge shell 22 in an unwinding direction.

The film winding wheel 3 is mounted on a top side of the cartridge chamber 23. The film winding wheel 3 has a shaft which is engaged with the spool 21 of the cartridge shell 22 placed in the cartridge chamber 23, so the spool 21 rotates as the film winding wheel 3 is rotated in a winding direction, i.e. a counterclockwise direction in FIG. 3. Thereby, the filmstrip 24 is wound back into the cartridge shell 22 one frame after each exposure.

Also a door closing mechanism is mounted under the film winding wheel 3, though it is not illustrated in the drawings, for closing the door member 22*a* when the exposed filmstrip 24 is completely wound back into the cartridge shell 22.

An exposure aperture 27 is formed through the basic portion 15 in between the cartridge chamber 23 and the film roll chamber 23. The exposure unit 16 is attached to a front side of the exposure aperture 27. The flash unit 18 is attached to the right side of the exposure unit 16. The flash unit 18 is an assembly in which the flash projector 5, a main capacitor 29, a battery 30 and other flash circuit elements mounted to a circuit board 28. In the exposure unit 16 is an assembly in which necessary members for exposure, including a shutter charging mechanism, a shutter mechanism, a film winding-stopping mechanism and a frame counter mechanism, and a finder optical system are integrally mounted to a base portion constituting an exposure chamber. Also, the charge condition indicator 9 is mounted to the exposure unit 16, so as to be movable up and down.

The mechanisms for exposure may be conventional ones which are constituted of a sprocket, a shutter drive lever, a stop lever, a shutter blade, springs and other elements. The sprocket is engaged in perforations of the filmstrip 24, and rotates as the filmstrip 24 moves toward the cartridge shell 22. The shutter drive lever is moved to a charged position against the force of the spring in cooperation with the sprocket, and the stop lever keeps the shutter drive lever in the charged position. The stop lever also locks the sprocket and the film winding wheel 3 when the sprocket makes a rotation corresponding to an advance of the filmstrip 24 by one frame. The stop lever releases the shutter drive lever and unlocks the sprocket and the film winding wheel 3 when the shutter button 4 is depressed. The released shutter drive lever kicks the shutter blade, so the shutter blade swings to make an exposure.

Figure 4:
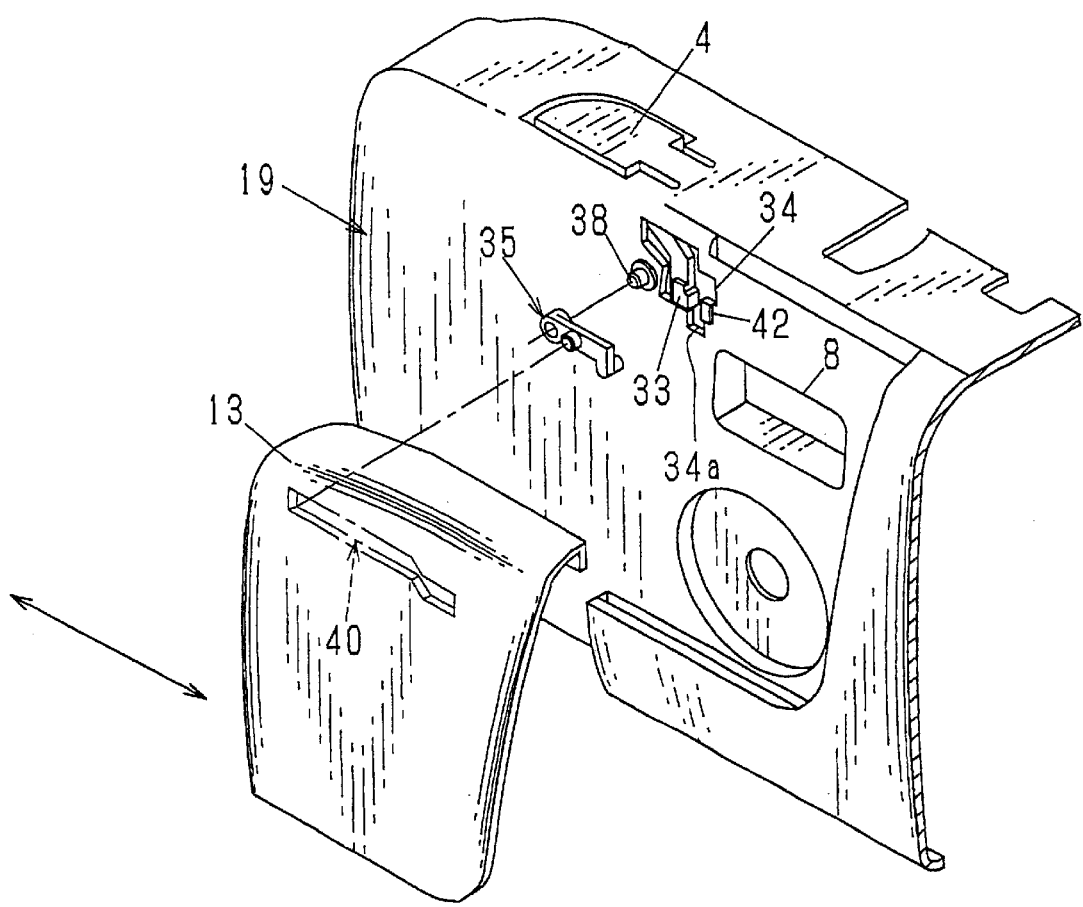
FIG. 4 shows an exploded fragmentary view of a front cover of the film unit of FIG. 1.

As shown in FIG. 4, the shutter button 4 is formed integrally with a top wall of the front cover 19, so as to be able to resiliently bend down. A pushing rod 33 is formed integrally with the shutter button 4 on the bottom side thereof, as shown in detail in FIG. 5. The pushing rod 33 transmits the downward movement of the shutter button 4 to the stop lever, for releasing the shutter drive lever. The pushing rod 33 partly protrude into an opening 34 which is formed through the front cover 19 on the left side of the finder objective window 8 in the drawing. This opening 34 is originally provided for a slide core that is used for forming the pushing rod 33 with the front cover 19 from a plastic resin.

A shutter locking member 35 is mounted in between the front cover 19 and the protective cover 13. The shutter locking member 35 pivots about its one end 37 on an axle 38 that is embedded in the front cover 19 proximate the opening 34. The shutter locking member 35 has a locking pin 39 at the other end thereof. The locking pin 39 protrudes into the opening 34. A cam pin 41 is formed on a front middle portion of the shutter locking member 35. The cam pin 41 is engaged in a cam slot 40 that is formed inside the protective cover 13.

The cam slot 40 consists of a lower section 41*a* and an upper section 40*b*. As the protective cover 13 slides to the closed position, the cam pin 41 moves from the lower section 40a to the upper section 40b, so the shutter locking member 35 rotates in a counterclockwise direction in FIG. 5. Then, the locking pin 39 moves up to a position in between the pushing rod 33 and a stop projection 42. The stop projection 42 is formed on one edge of the opening 34, for preventing deformation of the locking pin 39 when the shutter button 4 is pressed down in a state where the locking pin 39 is inserted between the pushing rod 33 and the stop projection 42. As long as the locking pin 39 is inserted in between the pushing rod 33 and the stop projection 42, the shutter button 4 is locked and is not able to move down. As the protective cover 13 slides to the open position, the cam pin 41 moves to the lower section 40a, so the shutter locking member 35 rotates in a clockwise direction, and the locking pin 39 moves down to a relief portion 34a of the opening 34. Because the locking pin 39 is removed from the pushing rod 33, the shutter button 4 is unlocked.

Figure 6:
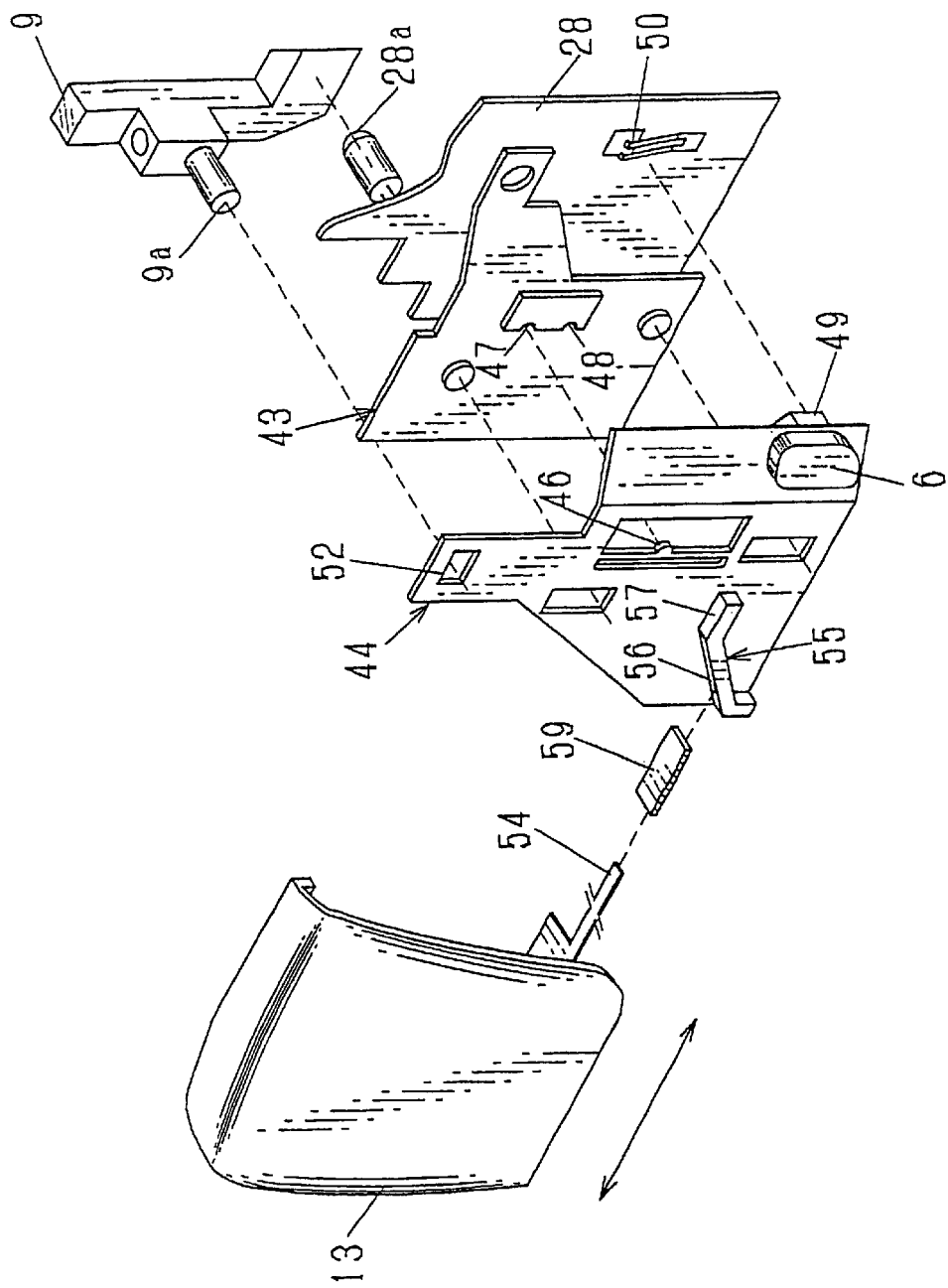
FIG. 6 shows an exploded view of a flash prevention mechanism that cooperates with the protection cover.

As shown in FIG. 6, a switch supporting plate 43 and a switch plate 44 are held between the circuit board 28 and the front cover 19. The switch plate 44 has the flash charge switch 6 mounted thereon. The switch supporting plate 43 supports the switch plate 44 so as to be slidable up and down. A clicking protuberance 46 clicks in an upper clicking notch 47 when the flash charge switch 6 reaches its ON position, or clicks in a lower clicking notch 48 when the flash charge switch 6 reaches its OFF position.

When the switch plate 44 moves with the flash charge switch 6 in the ON position, a boss 49, which is formed on the back side of the flash charge switch 6, pushes a switch contact blade 50, closing the flash circuit. When the flash circuit is closed, the main capacitor 29 starts being charged with the power from the battery 30. In the OFF position, the switch contact blade 50 removes from the flash circuit, terminating the charging operation of the flash circuit.

The switch plate 44 has an opening 52, and the opening 52 is engaged with a pin 9a which is formed on the charge condition indicator 9. Because of this connection, the charge condition indicator 9 moves up and down together with the switch plate 44. When the flash charge switch 6 and thus the switch plate 44 comes to the ON position, the charge condition indicator 9 comes out of the film unit 2, and conducts light from a completion-of-charging indication lamp 28a of the flash circuit 28 to the outside.

The switch plate 44 further has an interconnection member 55 for interconnecting the switch plate 44 with the protective cover 13. A strip 54 is formed on the back side of the protective cover 13, and protrudes to the right side of the protective cover 13 in FIG. 6. The strip 54 comes to contact with a sloped surface 56 of the interconnection member 55 and pushes down the switch plate 44 to the OFF position, while the protective cover 13 is moving to the closed position. When the protective cover 13 reaches the closed position, the strip 54 rides on a horizontal surface 57 of the interconnection member 55, preventing the switch plate 44 and the flash charge switch 6 from moving to the ON position. That is, only while the protective cover 13 is open, the flash charge switch 6 can be moved to the ON position. Designated by 59 is a protection plate which is formed on the back of the front cover 19 along and above a path of the strip 54, for protecting the strip 54 from being deformed or broken by a force that might be applied when the protective cover 13 is operated unreasonably.

The above described embodiment operates as follows:

While the film unit 2 is not used, the taking lens 7 and the finder objective window 8 are closed with the protective cover 13. In the closed position, the cam pin 41 is engaged in the upper section 40b of the cam slot 40, so the shutter locking member 35 is moved in the locking position where the locking pin 39 is in contact with the pushing rod 33, preventing the pushing rod 33 from activating the shutter drive lever even when the shutter button 4 is pushed by accident. Also, the strip 54 is pressed on the horizontal surface 57, preventing the flash charge switch 6 from moving to the ON position.

When using the film unit 2, the protective cover 13 is slid to the open position, uncovering the taking lens 7 and the finder objective window 10. Simultaneously, the cam pin 41 moves from the upper section 40b to the lower section 40a of the cam slot 40. Thereby the shutter locking member 35 moves to the unlocking position where the locking pin 39 is retracted in the relief portion 34a, allowing the pushing rod 33 to move. In cooperation with the protective cover 13 moving to the open position, the strip 54 is removed from the interconnection member 55, allowing the flash charge switch 6 to move to the ON position. Thus, the photographer can turn the flash charge switch 6 ON or OFF depending upon whether a flash photography is desired or not.

When the flash charge switch 6 is moved in the ON position, the switch contact 50 of the circuit board 28 is turned on to start charging the main capacitor 29. As the flash charge switch 6 moves to the ON position, the charge condition indicator 9 moves out. When the main capacitor 29 is charged up, the completion-of-charging lamp 28a starts lighting, and the light is displayed to the outside through the charge condition indicator 9.

By rotating the film winding wheel 3 in the counterclockwise direction in FIG. 3, the filmstrip 24 is wound into the cartridge shell 22, and the sprocket rotates with the movement of the filmstrip 24. In cooperation with the sprocket, the shutter drive lever moves to the charged position. When the filmstrip 24 is moved by one frame, the stop lever stops the sprocket and the film winding wheel 3 from rotating, and holds the shutter drive lever in the charged position.

Figure 5:
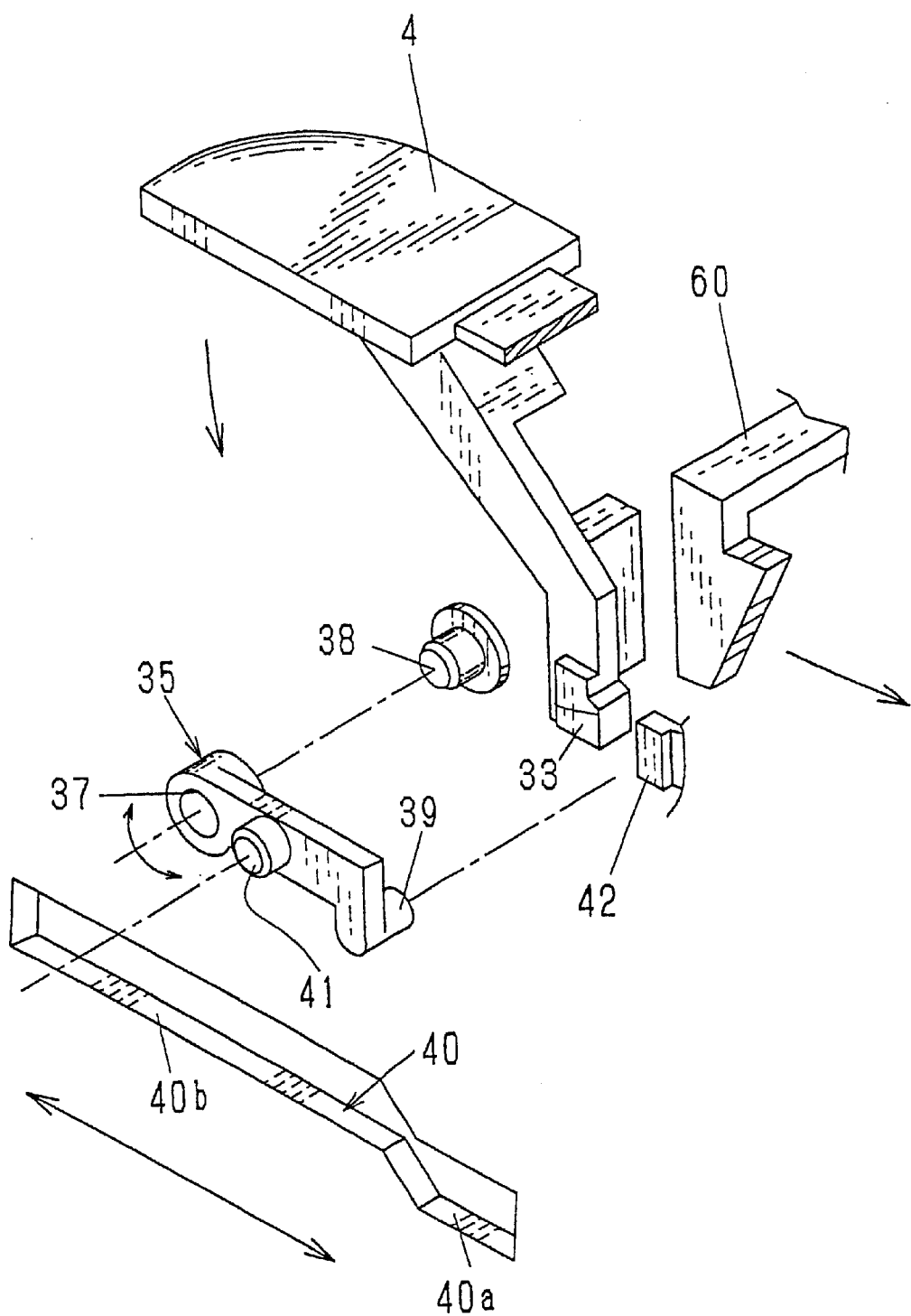
FIG. 5 shows an exploded view of a shutter locking mechanism that cooperates with the protection cover.

To take a photograph, the shutter button 4 is pushed, so the shutter button 4 bends down resiliently, and the pushing rod 33 pushes a portion 60 of the stop lever, as shown in FIG. 5. Thereby the stop lever releases the shutter drive lever from the charged position. Then, the shutter drive lever moves under the force of the spring, and kicks the shutter blade, thereby making an exposure. After releasing the shutter drive lever, the stop lever moves to a position unlocking the sprocket and the film winding wheel 3. Then, the photographer can wind up the filmstrip 24 for the next exposure.

When the last available exposure is finished, the stop lever is prevented from activating, so that the photographer can wind up the filmstrip 24 to the end. When the entire length of the filmstrip 24 is located inside the cartridge shell 22, the door closing mechanism detects the number of rotations of the film winding wheel 3 and closes the door member 22a of the cartridge shell 22.

The used-up film unit 2 is forwarded to a photo-lab, and the bottom lid 12 is opened to remove the exposed photo film cartridge 17. Since the door member 22a is closed at that time, the removal of the photo film cartridge 17 may be done under the light. Thereafter, development and printing are carried out in a conventional manner. The developed filmstrip 24 is rewound back into the cartridge shell 22, and is returned to the photographer, concurrently with the photoprints.

It is possible to omit the stop projection 42, because the locking pin 39 of the shutter locking member 35 alone can stop the pushing rod 33 from pushing the stop lever. Although the shutter locking member 35 is formed separately from the front cover 19, the shutter locking member 35 may be formed integrally with the front cover 19. In that case, the locking member should resiliently protrude into the opening 34 such that the locking member is resiliently bent into a locking position in cooperation with the cam slot 40. It is also possible to form the axle 38 integrally with the front cover 19.

The interconnection mechanism for interconnecting the protective cover 13 with the flash charge switch 6 is not limited to that shown in FIG. 6, but may be modified many ways insofar as the interconnection mechanism prevents the flash charge switch 6 from being turned on while the protective cover 13 is closed.

Figure 7:
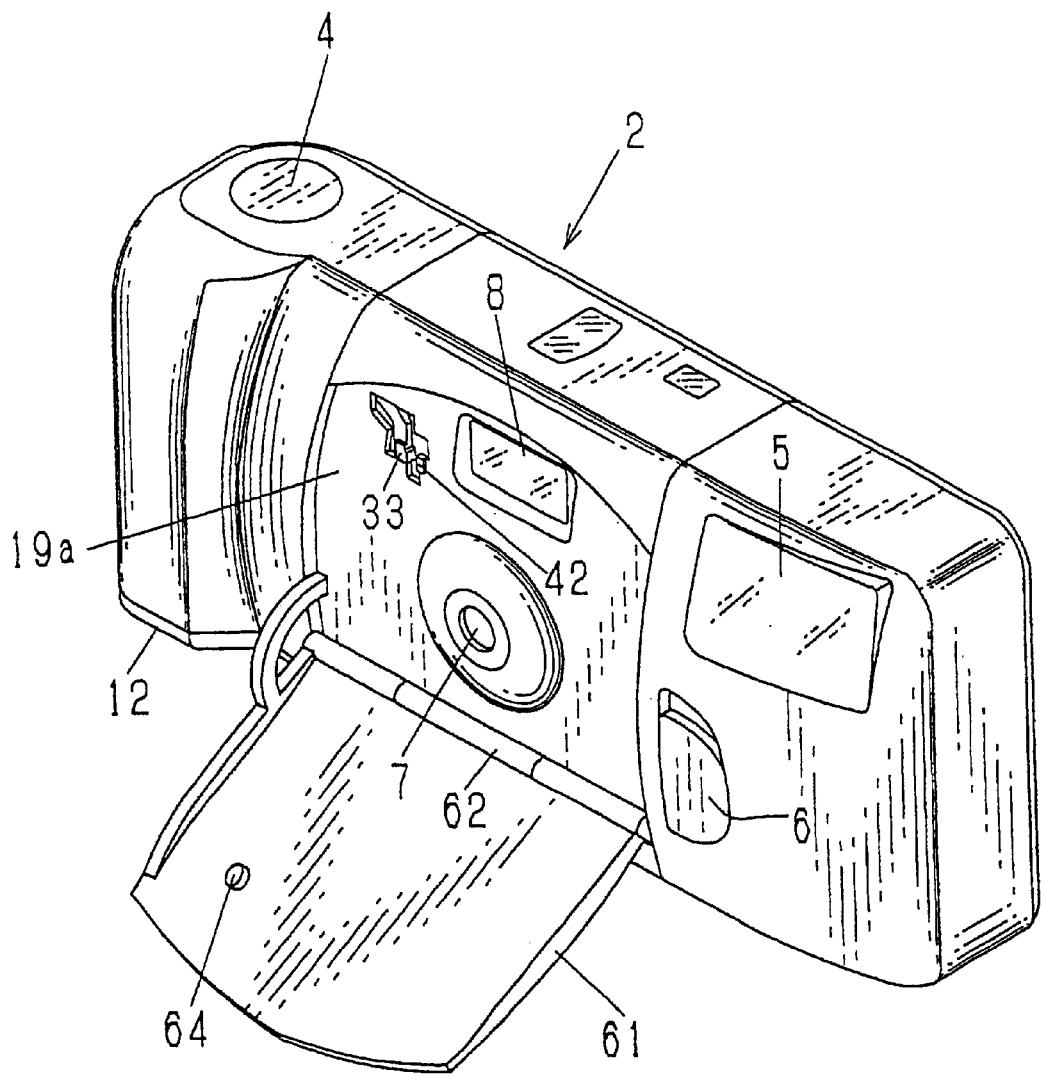
FIG. 7 shows a perspective view of a film unit with a shutter locking mechanism that cooperates with a protective cover, according to another preferred embodiment of the invention.

FIG. 7 shows a film unit according to a second embodiment, wherein a protective cover 61 is mounted to a middle front area 19a of the film unit 2 through a hinge 62 whose rotational axis extends in the horizontal direction, so the protective cover 61 flaps up and down between a closed position and an open position. In this embodiment, a shutter locking member 64 is a boss formed on a back side of the protective cover 61, such that the boss 64 is inserted in between a pushing rod 33 and a stop projection 42 when the protective cover 61 is closed. Accordingly, the shutter locking member 64 is simplified, though this embodiment is not provided with an interconnection mechanism for interconnecting the protective cover 61 with a flash charge switch 6.

Figure 8:
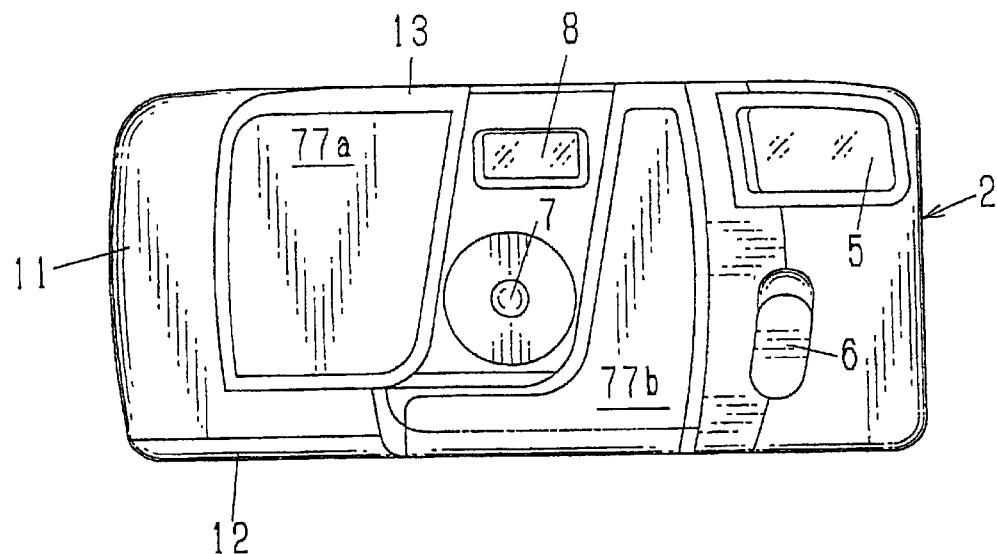
FIG. 8 shows a front view of a film unit according to another preferred embodiment of the invention, wherein labels partly wrap the film unit housing for reinforcement and decoration.

FIG. 8 shows a film unit 2 according to a third embodiment of the invention, wherein decorative labels 77a and 77b are stuck on the film unit housing. Other constructions may be equivalent to the first embodiment shown in FIGS. 1 to 6, so the detailed description of these constructions are omitted. The following description relates only to essential features to this embodiment. As shown in FIGS. 8 to 11, the first label 77a is stuck on the front surface of a protective cover 13, whereas the second label 77b is put around a middle zone of the film unit 2 excluding a front area where the protective cover 13 moves in and out, that is, where a taking lens 7 and a finder objective window 12 are located.

Figure 9:
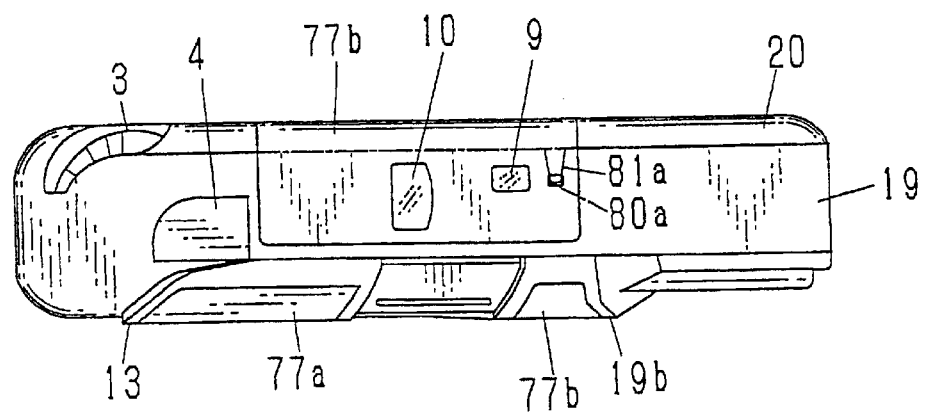
FIG. 9 shows a top plan view of the film unit of FIG. 8.

A rear cover 20 and a front cover 19 is fastened to each other through resilient hooks, so these covers 20 and 19 are separative from each other. Since the second label 77b extends across the joints between the rear and front covers 20 and 19, the second label 77b reinforces the joints. By putting the second label 77b on those areas where the hooks for fastening the covers 19 and 20 to each other are located, the joints is still more reinforced. In the present embodiment, the second label 77b covers a top side area of the rear cover 20 where a hook 81a is formed, and a top side area of the front cover 19 where a hole 80a to engage the hook 81a is formed, as shown in FIG. 9. The second label 77b also covers a bottom side area of the front cover 19 where hooks 80b and 80c are formed, and a bottom side area of the rear cover where holes 81b and 81c to engage the hooks 80b and 80c are formed, as shown in FIG. 10.

Figure 11:
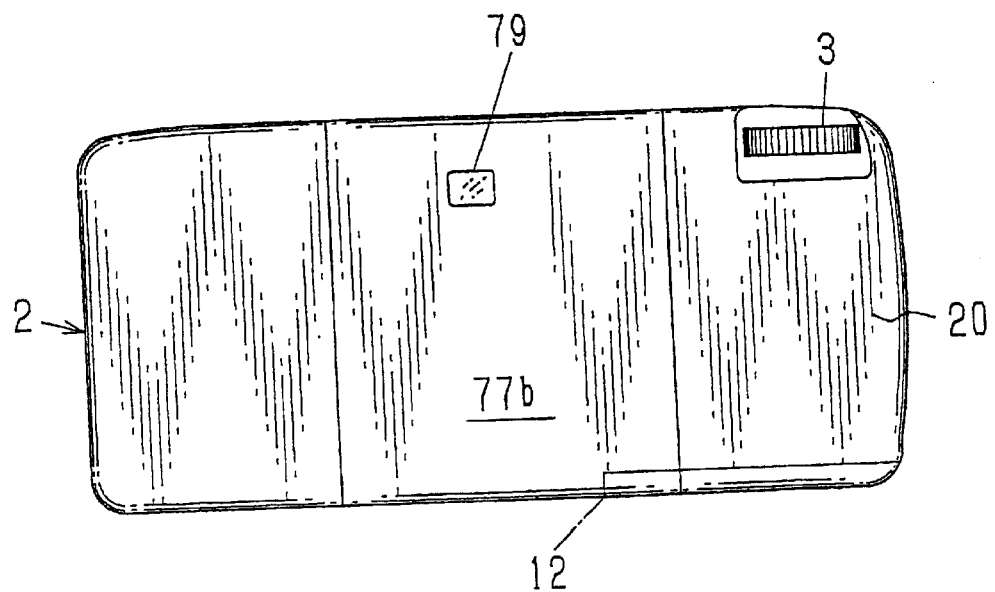
FIG. 11 shows a rear side view of the film unit of FIG. 8.

The second label 77b has openings and cutouts for exposing a charge condition indicator 9, a frame counter window 10, and a finder eyepiece window 79 of the film unit 2, as shown in FIGS. 9 and 11. As shown in FIG. 9, the front surfaces of the labels 77a and 77b are even with the front surface of the protective cover 13 and a face surface 19b of the front cover 19.

Figure 10:
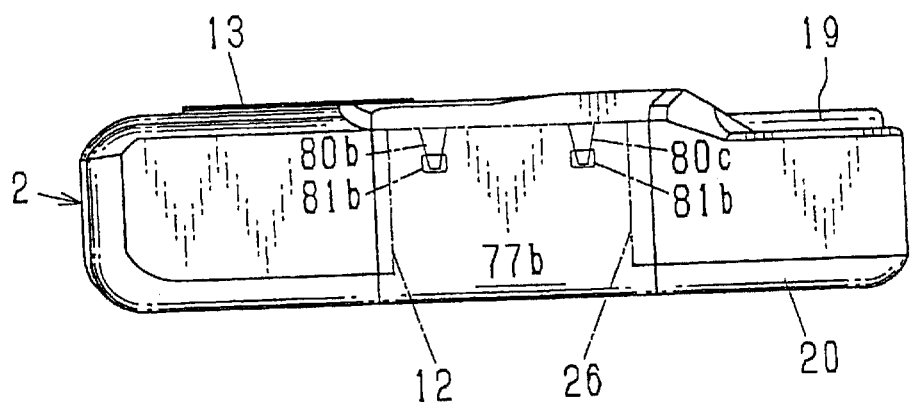
FIG. 10 shows a bottom view of the film unit of FIG. 8.

As shown in FIG. 10, bottom lids 12 and 26 are formed integrally with the rear cover 20, and are fastened to the front cover 19 through snap-in engagement of resilient hooks that are not shown but formed integrally with the bottom lids 12 and 26, so the bottom lids 12 and 26 may be opened. The bottom lids 12 and 26 are also reinforced by the second label 77b as partly sealing the bottom lids 12 and 26. Thus, the second label 77b prevents the bottom lids 12 and 26 from opening when the film unit 2 drops by accident during the transportation or while the photographer carries about.

Figure 12:
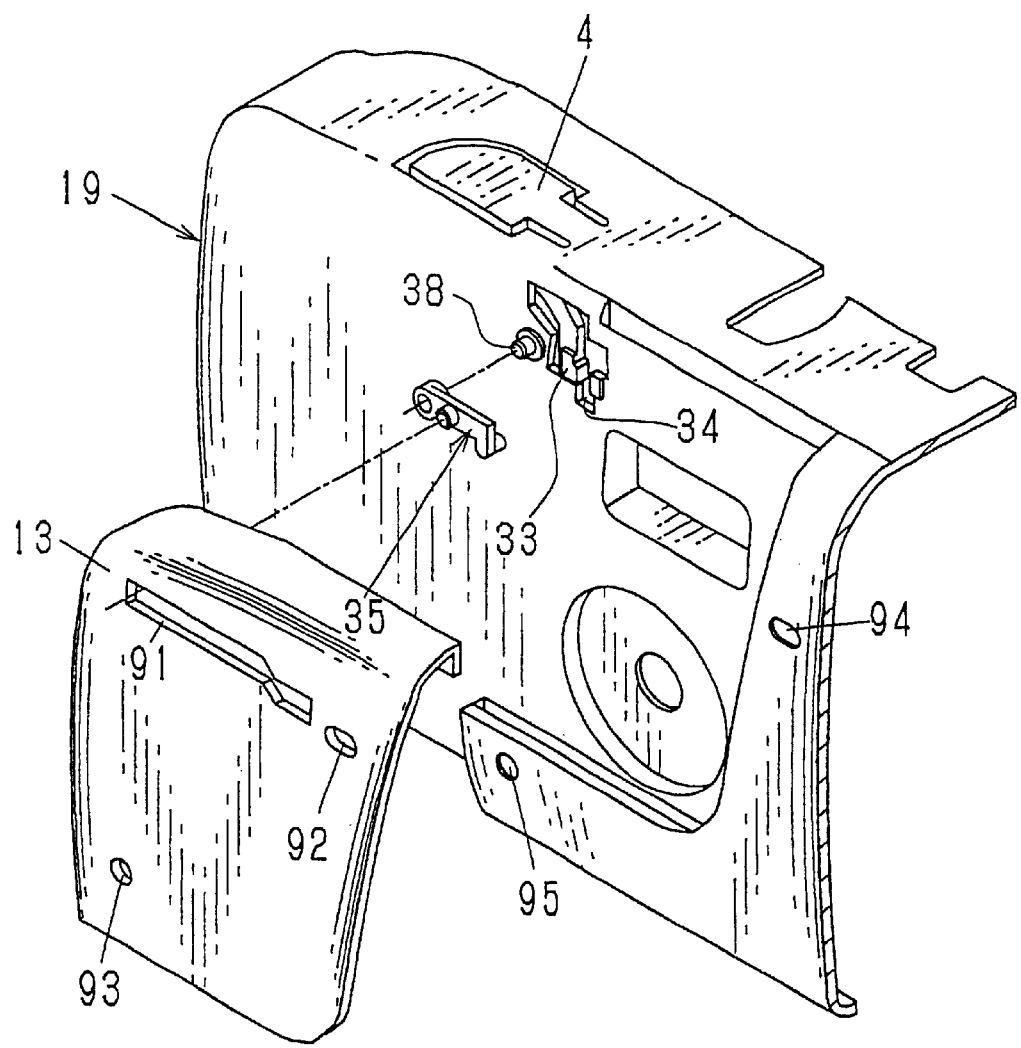

As shown in FIG. 12, this embodiment has a shutter locking mechanism that is similar to the shutter locking mechanism of the first embodiment, but a cam slot 91 for interconnecting the protective cover 13 with a shutter locking member 35 is formed as an opening formed through the protective cover 13. Besides the cam slot 91, there are openings 92 and 93 which are needed for plastic forming or assembling, but are not needed to be exposed to the outside for photography. The first label 77a covers up the cam slot 91 and the openings 92 and 93 for decoration and for preventing dusts and other extraneous substances from entering the openings 91 to 93. Also the front cover 19 is formed with many openings 94 and 95 which are needed for assembling or inspection, but are not needed to be exposed to the outside for photography. The second label 77b also covers up these openings 94 and 95. It is to be noted that the shutter locking member 35 and an opening 34 are always shielded by the protective cover 13 regardless of whether the protective cover 13 is open or closed.

Figure 13:
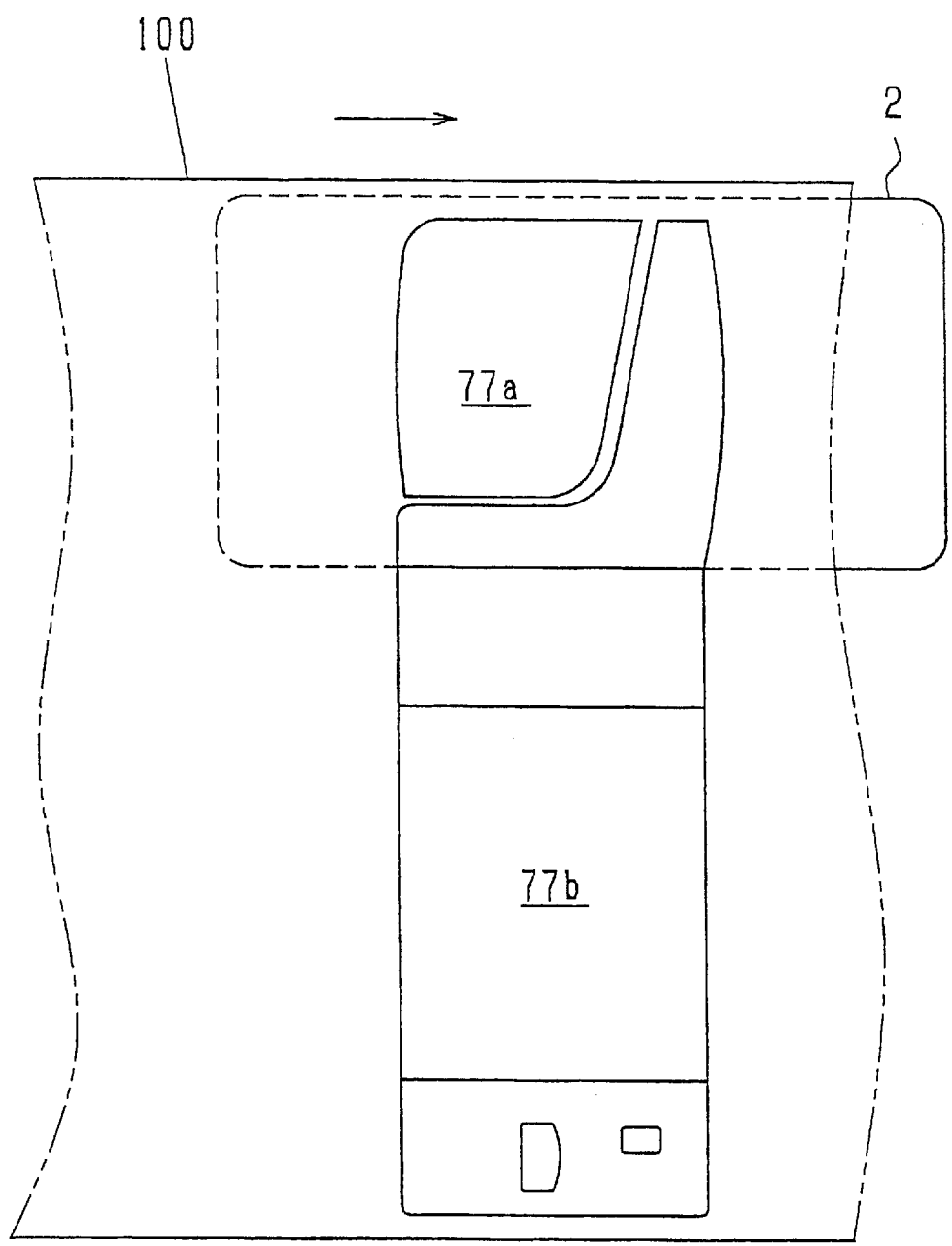
FIG. 13 shows a diagram illustrating a labeling process of the labels.

The labels 77a and 77b are stuck on the film unit housing after the film unit 2 is assembled and get through an inspection. In a labeling station, the film unit 2 is positioned with its front side up. The labels 77a and 77b are blanked out from an elongated label sheet 100, as shown in FIG. 13. The label sheet 100 has a width that is defined according to a longitudinal length of the unfolded second label 77b, and is fed to the labeling station in the longitudinal direction of the film unit 2 positioned in the labeling station, as shown by an arrow in FIG. 13. The labels 77a and 77b are concurrently transferred to a suction drum, and are concurrently stuck on the front of the film unit 2. The first label 77a is thus stuck on the protective cover 13. Thereafter, the film unit 2 is turned over to put the remaining portion of the second label 77b around the film unit 2. The film unit 2 attached with the labels 77a and 77b in this way is shipped out after passing an appearance inspection.

Since the labels 77 cover up the cam slot 91, the openings 92 to 95 and other openings that are not need to be exposed, the labels 77a and 77b improve the appearance and the dust-proof property of the film unit 2. Moreover, the second label 77b crosses over the joints between the front and rear covers 19 and 20, reinforcing the joint. As the bottom lids 12 and 26 are partly sealed by the second label 77b, the bottom lids 12 and 26 would not easily open to expose the film by accident, even if the film unit 2 is shocked with a drop during the transportation or the like. Since the labels 77a and 77b are simultaneously stuck on the film unit housing, the work efficiency is improved.

The film unit 2 is shipped out with its taking lens 7 and the finder objective window 8 closed with the protective cover 13. In this closed position, the shutter locking member 35 is moved in the locking position to hinder a pushing rod 33 from moving, and thus prevent an accidental shutter release.

FIGS. 14 to 17 show a film unit 2 according to a fourth embodiment of the invention, whose constructions are substantially equal to the first embodiment, so the following description relates only to those features essential to this embodiment.

Figure 16:
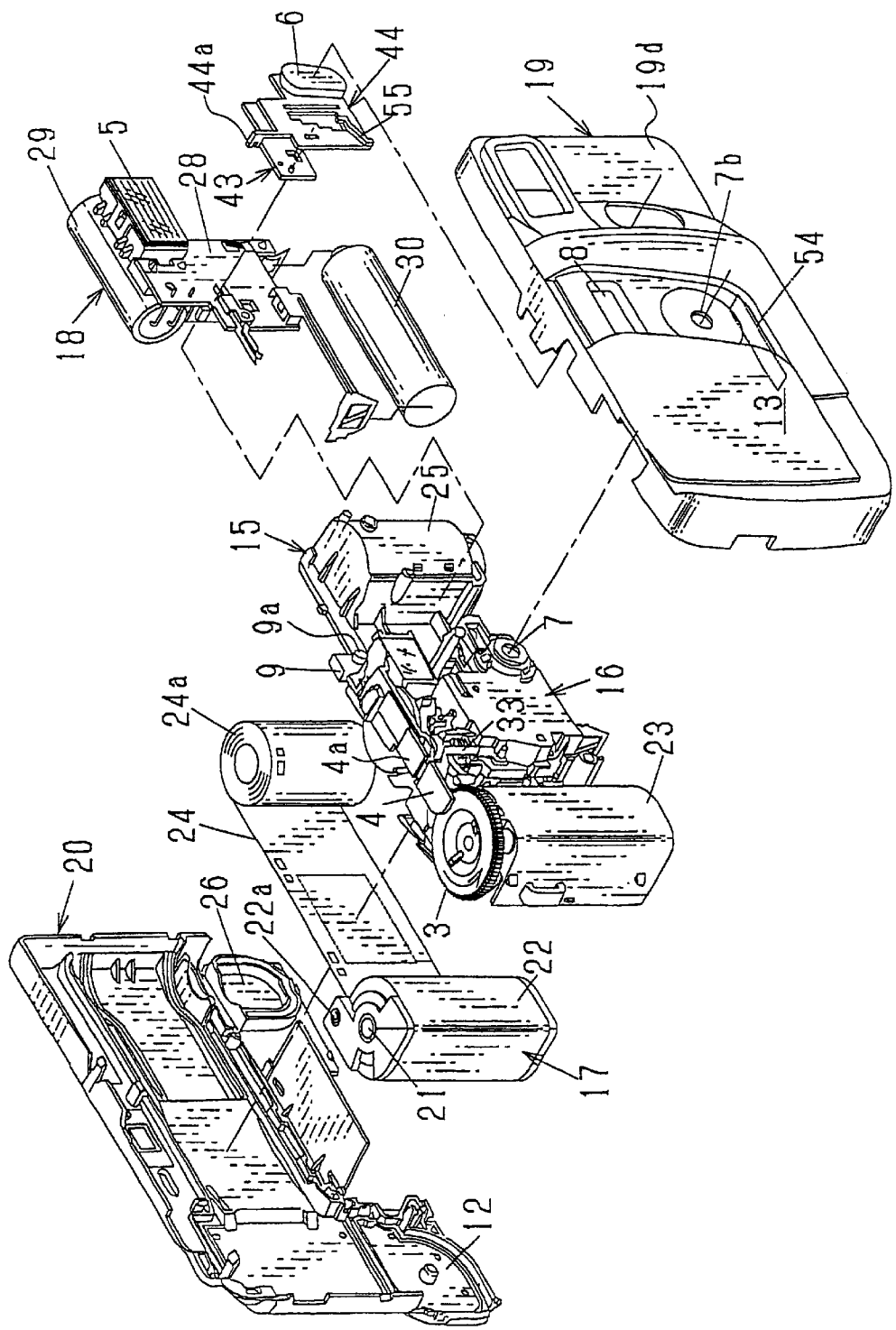
FIG. 16 shows an exploded perspective view of the film unit of FIG. 14.

As shown in FIG. 16, a shutter button 4 is formed at one end of a thin-walled plate 4a, and the opposite end of the thinner plate 4a is secured to a top side of an exposure unit 16 through a snap-in engagement, such that the shutter button 4 is resiliently movable by an amount necessary for the shutter release. A pushing rod 33 is integrally formed on a bottom side of the shutter button 4.

Figure 14:
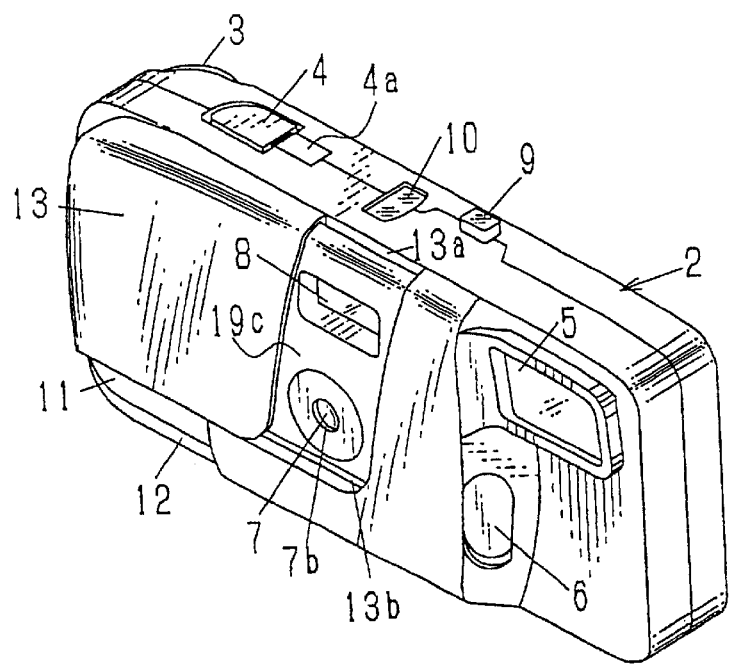
FIGS. 14 and 15 show a film unit according to another preferred embodiment of the invention.
Figure 15:
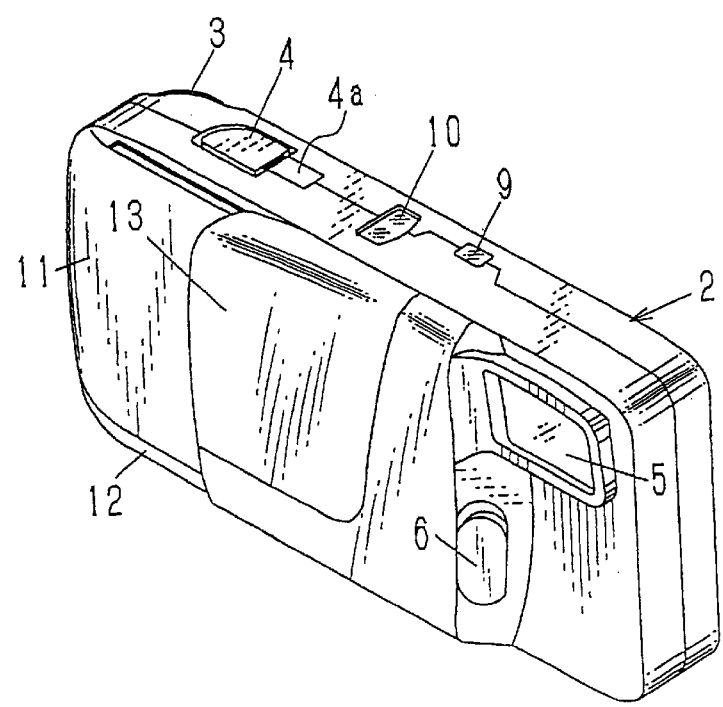

A switch plate 44 has a flash charge switch 6 and a coupling member 44a formed integrally therewith. The coupling member 44a is engaged with a pin 9a which is formed on a front side of a charge condition indicator 9. Accordingly, when the flash charge switch 6 is set to an upper ON position, the switch plate 44 moves up together with the flash charge switch 6 and brings the charge condition indicator 9 out of the film unit 2, as shown in FIG. 14. Simultaneously, a flash circuit on a circuit board 28 starts charging. When the flash charge switch 6 is set to a lower OFF position, the charge condition indicator 9 moves down, and the flash circuit stops charging, as shown in FIG. 15.

Figure 17:
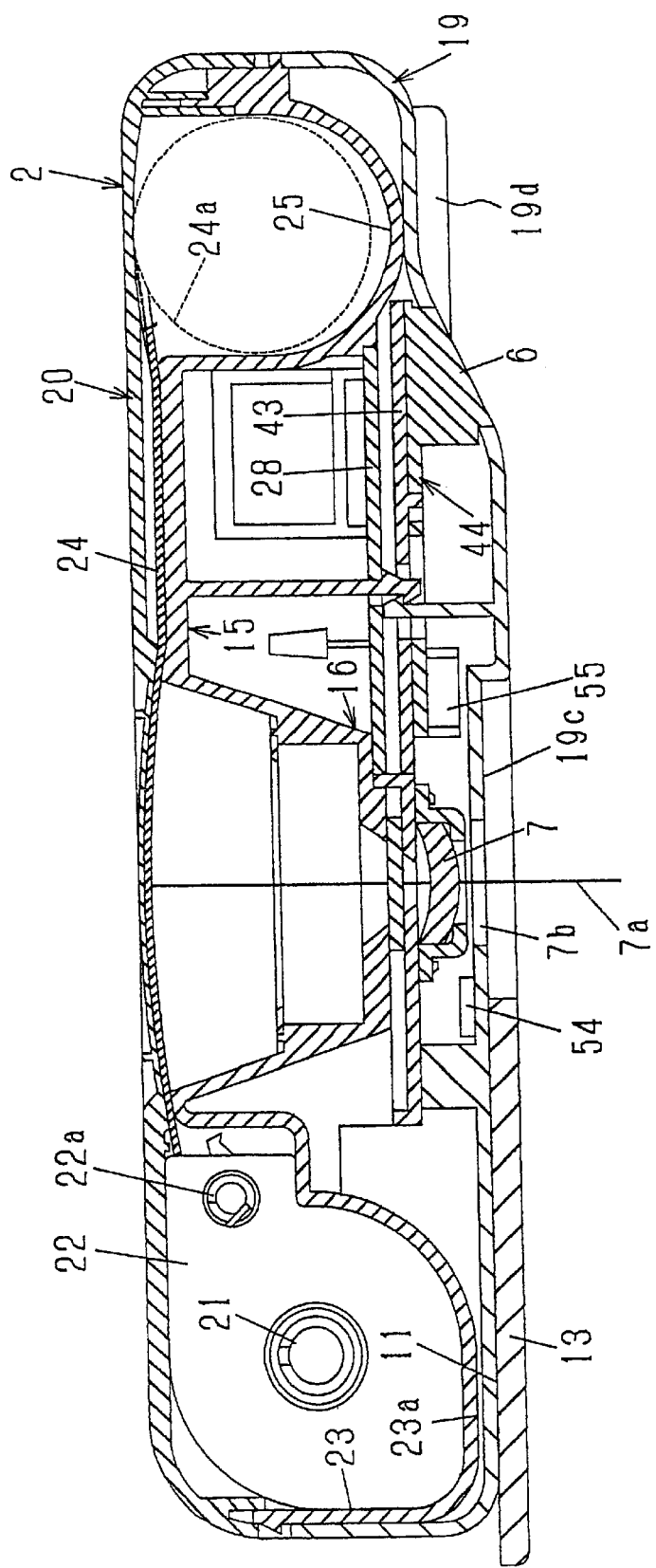
FIG. 17 shows a horizontal section of the film unit of FIG. 14.

The front surface of the front cover 19 is straight in the longitudinal direction of the film unit 2 at least in a range from a middle front area 19c having a lens opening 7b to a left front area 11 placed in front of a cartridge chamber 23, as shown in the horizontal section of FIG. 17. That is, the front surface of the front cover 19 is straight in the longitudinal direction in the sliding range of a protective cover 13 on the front cover 19. Therefore, the protective cover 13 slides smoothly and stably on the front surface of the front cover 19. Moreover, it is easy to provide sliding grooves 13a and 13b along the longitudinal or horizontal direction of the film unit 2 above a finder objective window 8 and below a taking lens 7 respectively. The sliding grooves 13a and 13b not only guide the protective cover 13, but also prevent the protective cover 13 from dropping off the front cover 19. It is to be noted that the middle and left front areas 19c and 11 may be a flat surface or may be a vertically curved convex surface.

A right front area 19d of the front cover 19 that is placed in front of a film roll chamber 25 is recessed from the middle and left front areas 19c and 11. The flash charge switch 6 is placed in a sloped surface between the right front area 19d and the middle front area 19c. A minimum thickness of the film unit 2 around the cartridge chamber 23 depends on the diameter of the cartridge shell 22 contained therein. A minimum thickness of the film unit 2 along an optical axis 7a of the taking lens 7 depends on the focal length of the taking lens 7. According to the present embodiment, the taking lens 7 is a pan-focus lens whose focal length is determined such that a distance from a rear cover 20 to a face end of the taking lens 7 may be equal to or less than a distance from the rear cover 20 to an outer front surface 23a of the cartridge chamber 23. Because of this configuration, it is easy to make the range from the middle front area 19c to the left front area 11 straight in the longitudinal direction of the film unit 2.

Since the film unit 2 have the same thickness at around the cartridge chamber 23 and around the taking lens 7, the film unit 2 may have the slidable protective cover 13 with little increase of the whole thickness of the film unit.

In view of the state of the art, the thickness of the film unit 2 is desired to be less than 30 mm. So the focal length of the taking lens 7 is to be 27 mm or less, and preferably 25 mm or less, for maintaining the film unit 2 to be comparable in the thickness to conventional thin film units with no slidable protective cover. By using an IX240 type photo film cartridge 17, the thickness around the cartridge chamber 23, i.e., the thickness from the rear cover 20 to the left front area 11 of the front cover 19 can be reduced to 25 mm. Then, the film unit 2 can be made thinner by reducing the focal length of the taking lens 7 to 25 mm or less, and preferably to 24 mm or less.

When the taking lens 7 has a focal length of 27 mm to 25 mm, the angle of view of the taking lens 7 comes to be approximately equal to the angle of view of human eyes, so the taking lens 7 is suitable for standard printing where the entire area of a picture frame is printed. On the other hand, when the taking lens 7 has a focal length of 24 mm or less, the angle of view of the taking lens 7 gets wider than that of human eyes. Therefore, the taking lens 7 with the shorter focal length is suitable for panoramic printing where a picture frame is printed after being cropped into a panoramic size. The shorter the focal length of the taking lens 7, the more the taking lens 7 is located rearward of the film unit 2, and the film unit 2 may be made the thinner.

Although the unit housing consists of two parts, the front and rear covers, in the above described embodiments, the present invention is applicable to those film units whose unit housing consists of more than two parts.

INDUSTRIAL APPLICATION FIELD

The present invention is applicable to a film unit using a photo film cartridge of IX240 type or a film unit using a conventional 135 type photo film cartridge. The present invention is also applicable to a film unit using a special photo film cartridge that contains a 135 filmstrip and has a smaller diameter than conventional.

What is claimed is:

1. A lens-fitted photo film unit having a flash unit incorporated therein, the film unit comprising:

a protective cover movable between a closed position covering a taking lens and an open position uncovering the taking lens;

a flash charge switch movable upon manual operation between an ON position for starting charging a main capacitor of the flash unit and an OFF position for terminating charging the main capacitor, wherein the ON position is selected when a photography with flash is to make, and the OFF position is selected when a photography without flash is to make; and a flash preventing device which prevents the flash charge switch from being moved to the ON position when the protective cover is in the closed position, and allows the flash charge switch to be appropriately set either to the ON position or to the OFF position when the protective cover is in the open position, and forcibly moves the flash charge switch to the OFF position in cooperation with the protective cover as the protective cover moves to the closed position when the flash charge switch is in the ON position.

2. A lens-fitted photo film unit as claimed in claim 1, wherein the protective cover is slidable to the open position located at one horizontal side of the taking lens, whereas the flash charge switch is located at the other horizontal side of the taking lens and is slidable in a vertical direction, and the flash prevention device interconnects the protective cover with the flash charge switch while the protective cover is moving to the closed position.

3. A lens-fitted photo film unit as claimed in claim 1, comprising:

a cartridge chamber and a film roll chamber on opposite horizontal sides of the taking lens; and a bottom lid at the bottom of the cartridge chamber, the bottom lid being used for letting a cartridge in and out, and extending a little to the front portion of the film unit beyond a front bottom corner of the film unit, wherein the protective cover for opening and closing the taking lens, the protective cover having a vertical length that does not reach the front bottom corner of the film unit and being movable between a position in front of the taking lens and a position in front of the cartridge chamber without interfering with the bottom lid.

4. A lens-fitted photo film unit comprising:

a shutter button resiliently displaced upon a pressing operation;

a pushing rod which is displaced together with the shutter button;

a shutter mechanism activated when the displacement of the shutter button is transmitted thereto through the pushing rod;

an opening formed through a front wall of the film unit in opposition to the pushing rod;

a protective cover movable between a closed position covering a taking lens and an open position uncovering the taking lens, the protective cover having a slot disposed on an inward-directed face thereof; and a locking member engaging the slot of the protective cover, the locking member being positioned to prevent the displacement of the shutter button from being transmitted to the shutter mechanism when the protective cover is in the closed position, wherein in the closed position of the protective cover the locking member engages a first portion of the slot and moves through the opening in a locking position where the locking member prevents the displacement of the pushing rod, whereas in the open position of the protective cover the locking member engages a second portion of the slot and moves in an unlocking position where the locking member allows the displacement of the pushing rod, and thereby allows activating the shutter mechanism.

5. A lens-fitted photo film unit as claimed in claim 4, wherein the protective cover is slidable horizontally in front of the film unit, and the shutter locking device comprises cam members for moving the locking member between the locking position and the unlocking position in cooperation with the protective cover sliding.

6. The lens-fitted photo film unit of claim 4, wherein the first and second portions of the slot are laterally displaced from one another.

7. A lens-fitted photo film unit having a flash unit incorporated therein, the film unit comprising:

a protective cover movable between a closed position covering a taking lens and an open position uncovering the taking lens;

a flash charge switch movable upon manual operation between an ON position for starting charging a main capacitor of the flash unit and an OFF position for terminating charging the main capacitor, wherein the ON position is selected when a photography with flash is to make, and the OFF position is selected when a photography without flash is to make; and a flash preventing device which prevents the flash charge switch from being moved to the ON position when the protective cover is in the closed position, and allows the flash charge switch to be appropriately set either to the ON position or to the OFF position when the protective cover is in the open position, and forcibly moves the flash charge switch to the OFF position in cooperation with the protective cover as the protective cover moves to the closed position when the flash charge switch is in the ON position;

wherein the protection cover is hinged to a front portion of the film unit so as to flap up and down about a horizontal axis, and the locking member is provided on the back of the protective cover.

* * * * *

UNITED STATES PATENT AND TRADEMARK OFFICE
CERTIFICATE OF CORRECTION

PATENT NO. : 6,574,431 B2
DATED : June 3, 2003
INVENTOR(S) : Yuji Mikami et al.

It is certified that error appears in the above-identified patent and that said Letters Patent is hereby corrected as shown below:

<u>Column 14,</u>
After line 36, insert the following claim:

8. The lens-fitted photo film unit of claim 6, wherein the first and second portions of the slot are parallel to one another.

Signed and Sealed this

Twenty-fourth Day of August, 2004

JON W. DUDAS
*Director of the United States Patent and Trademark Office*